United States Patent [19]

Nutting

[11] Patent Number: 5,486,077
[45] Date of Patent: Jan. 23, 1996

[54] CARGO HANDLING SYSTEM ROLLOUT STOP ASSEMBLY

[75] Inventor: Harold E. Nutting, Everett, Wash.

[73] Assignee: The Boeing Company, Seattle, Wash.

[21] Appl. No.: 340,777

[22] Filed: Nov. 17, 1994

[51] Int. Cl.⁶ .................................................... B60P 7/135
[52] U.S. Cl. .............................. 410/69; 410/94; 410/105; 244/118.1; 244/137.1
[58] Field of Search ................................. 410/69, 77, 78, 410/79, 92, 94, 105; 244/118.1, 137.1; 248/503

[56] References Cited

U.S. PATENT DOCUMENTS

| | | |
|---|---|---|
| 3,698,679 | 10/1972 | Lang et al. . |
| 3,778,012 | 12/1973 | Fernandez .................................. 410/69 |
| 4,375,932 | 3/1983 | Alberti . |
| 4,388,030 | 6/1983 | Skaale . |
| 5,004,387 | 4/1991 | Jensen et al. . |
| 5,090,638 | 2/1992 | Eilenstein-Wiegmann ........... 410/69 X |
| 5,265,991 | 11/1993 | Herrick et al. ......................... 410/79 X |
| 5,316,242 | 5/1994 | Eilenstein-Wiegmann et al. 249/137.1 |

OTHER PUBLICATIONS

"Boeing Commercial Jet Overhaul Manul", 65B63560 25-57-22 p. 9 dated Aug. 1, 1988 and p. 10 dated Apr. 5, 1978.

E. Oberg and F. Jones, "Machinery's Handbook, A Reference Book for the Mechanical Engineer, Draftsman, Toolmaker and Machinist", Clutches and Couplings Industrial Press Inc., Machinery Publishing Co., Brighton England, Third Printing 1970 pp. 675–679.

Primary Examiner—Michael S. Huppert
Assistant Examiner—Stephen Gordon
Attorney, Agent, or Firm—William C. Anderson

[57] ABSTRACT

A cargo handling system rollout stop assembly, which allows a movable object to freely pass over it in a first or inboard direction but obstructs passage of that object in the opposite or outboard direction. The stop assembly comprises a frame and at least one arm assembly rotatably mounted in the frame. The arm assembly normally extends in an upright position in the path of the movement of the object and is capable of slight translation in the first direction. The arm assembly has a straight or linear camming surface all of whose centerline points are equidistant from the axis of rotation of the arm assembly. When the camming surface engages the object moving in the first direction, the arm assembly is translated slightly in the first direction and rotated downwardly out of the path of the object. A dog clutch assembly releasably connects the arm assembly to the frame. The dog clutch assembly normally prevents the arm assembly from rotating from its upright position, but is uncoupled when the object engages the camming surface causing the arm assembly to translate slightly in the first direction and rotate downwardly. A compression-torsional spring rotates the arm assembly upwardly back into the path of the object after the object has passed beyond the arm assembly. The arm assembly has an abutment surface for contacting the object after the arm assembly has been rotated back to its normal upright position whereby movement of the object in the opposite direction is obstructed. The arm assembly may be locked in a down position for unloading the object in the opposite direction.

12 Claims, 9 Drawing Sheets

CARGO HANDLING SYSTEM ROLLOUT STOP ASSEMBLY

TECHNICAL FIELD

This invention relates to a mechanism which allows movement of an object in one direction but prevents movement of the object in an opposite direction. More particularly, this invention relates to a cargo handling system rollout stop assembly mounted on the cargo deck of an airplane which allows movement or translation of a cargo container in a first or inboard direction onto the airplane but prevents inadvertent movement of the container in the opposite or outboard direction.

BACKGROUND OF THE INVENTION

In modern cargo carrying airplanes, it is desirable to reduce the time required for loading and unloading cargo containers to an absolute minimum. The cargo is normally packaged in specially designed containers or pallets which are shaped to utilize all available space within the cargo compartment of the airplane. The cargo deck typically comprises a plurality of ball mats containing rollers balls to ease the passage of the cargo containers or pallets over the deck and into a final stowed position somewhere in the airplane. In many airplanes, cargo may be loaded through the nose section of the airplane and/or through a side cargo door.

During loading operations, the airplane cargo deck may not be precisely level. The crew must exercise care to assure that an unattended container or pallet does not slide, or roll back through the door opening. In order to keep the containers or pallets inside the airplane until they are secured to the main cargo deck, it is common practice to employ stop assemblies near the entrance or sill of the cargo door. In operation, the stop assemblies act like one-way gate assemblies that allow a cargo container or pallet to pass into or inboard the airplane but prevent passage of the container or pallet out of or outboard the airplane after the container or pallet has cleared the stop assembly.

A number of rollout stop assemblies have been designed and used for these purposes. For example, see the assemblies described in U.S. Pat. Nos. 3,698,679 and 4,375,932 to Lang, et al. and Alberti, respectively. These assemblies use complex linkages and are expensive to manufacture. Because of the complexity, reliability of the assemblies is not as high as customers demand. Finally, repair of these assemblies can be quite expensive.

The rollout stop assembly of U.S. Pat. No. 5,004,387 to Jensen, et al. comprises a stop rotatably mounted to a frame attachable to the cargo deck of an airplane proximate the sill of a side cargo door. The stop includes a vane that is spring biased to normally extend upwardly into the path of a cargo container being loaded in an inboard direction through the side cargo door. The vane has a spiral camming surface that, when properly engaged by the container, causes the vane to rotate downwardly into the frame and out of the path of the container. Once the container passes the vane, it rotates back to its normal upward position whereby an abutment surface, forming part of the vane, may engage the container to prevent it from moving outboard of the airplane.

While the Jensen, et al. stop assembly is simple, relatively inexpensive to manufacture, and generally reliable, it may not always operate as intended. This can occur if the cargo containers warp upwardly about their periphery. Unfortunately, it is common for cargo containers to do so after extended use. As a consequence, the upwardly warped leading edge of a container may contact the spiral camming surface at an inboard high point where the moment arm that can be produced by the camming surface is low or negative. If the moment arm is too low, little or no downward rotation of the vane may result. When this happens, the cargo container is prevented from being loaded because the vane obstructs inboard motion.

SUMMARY OF THE INVENTION

In accordance with this invention, an airplane cargo handling system rollout stop assembly, which allows a movable object to freely pass over it in a first or inboard direction but obstructs passage of that object in the opposite or outboard direction, is disclosed. The stop assembly comprises a frame and at least one arm assembly rotatably mounted in the frame. The arm assembly normally extends in an upright position in the path of the movement of said object and is capable of slight translation in the first direction. The arm assembly has a straight or linear camming surface all of whose centerline points are equidistant from the axis of rotation of the arm assembly. When the object moving in the first direction engages the camming surface, the arm assembly is translated slightly in the first direction and rotated downwardly out of the path of the object. A dog clutch assembly releasably connects the arm assembly to the frame. The dog clutch assembly normally prevents the arm assembly from rotating from its upright position, but is uncoupled when the object engages the camming surface causing the arm assembly to translate slightly in the first direction and rotate downwardly. A compression-torsional spring rotates the arm assembly upwardly back into the path of the object after the object has passed beyond the arm assembly. The arm assembly has an abutment surface for contacting the object after the arm assembly has been rotated back to its normal upright position whereby movement of the object in the opposite direction is obstructed. The arm assembly may also be locked in a down position for unloading the object in the opposite or outboard direction.

BRIEF DESCRIPTION OF THE DRAWINGS

The foregoing and other features and advantages of the present invention will become more readily appreciated as the same becomes better understood by reference to the following detailed description of an embodiment of the invention and the accompanying drawings wherein like numbers refer to the same or similar parts and wherein.

DETAILED DESCRIPTION OF THE PREFERRED EMBODIMENT

Figure 1:
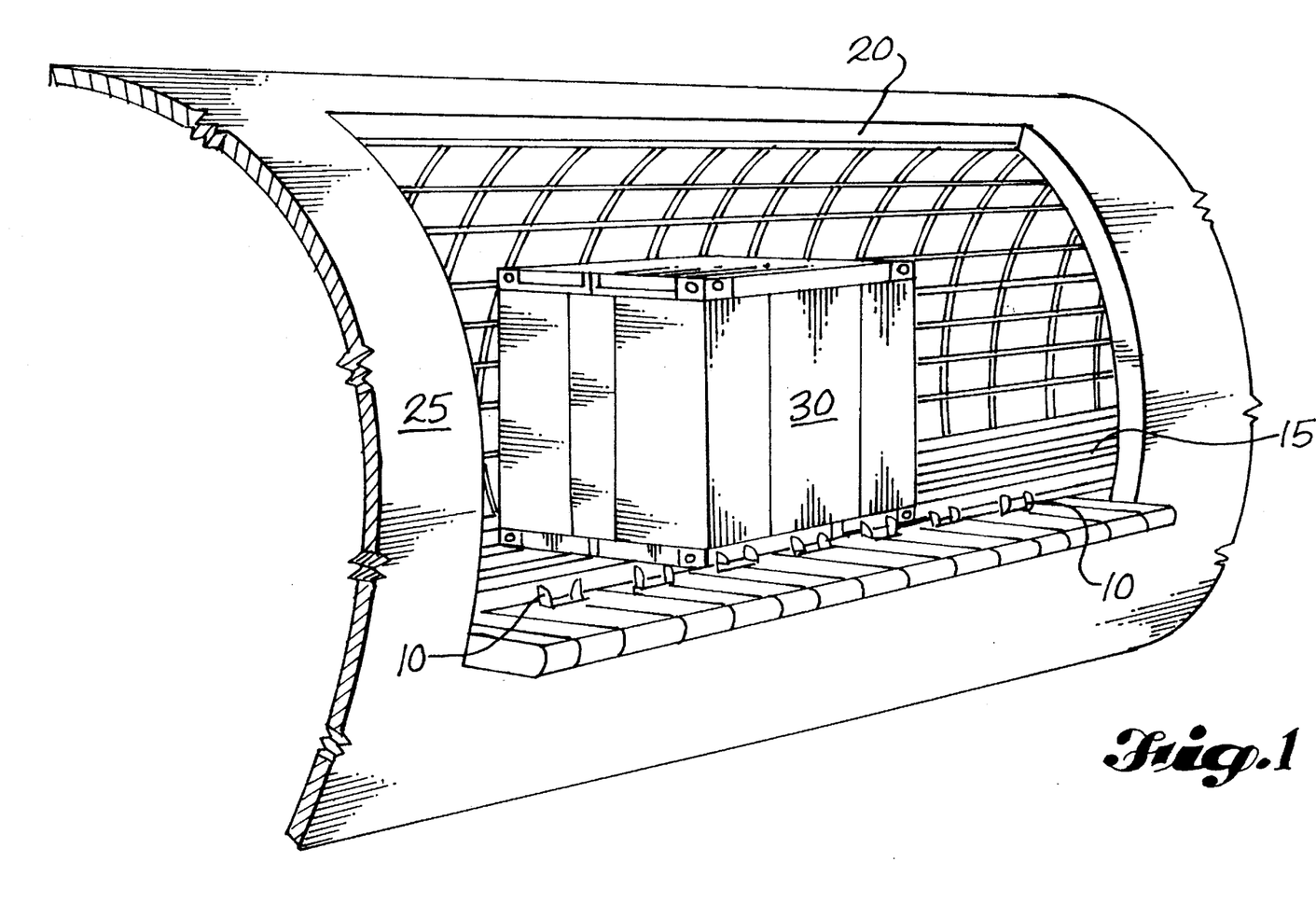
FIG. 1 is an environmental perspective of a side door area of an airplane utilizing a cargo system rollout stop assembly made in accordance with the principles of the present invention.
Figure 2:
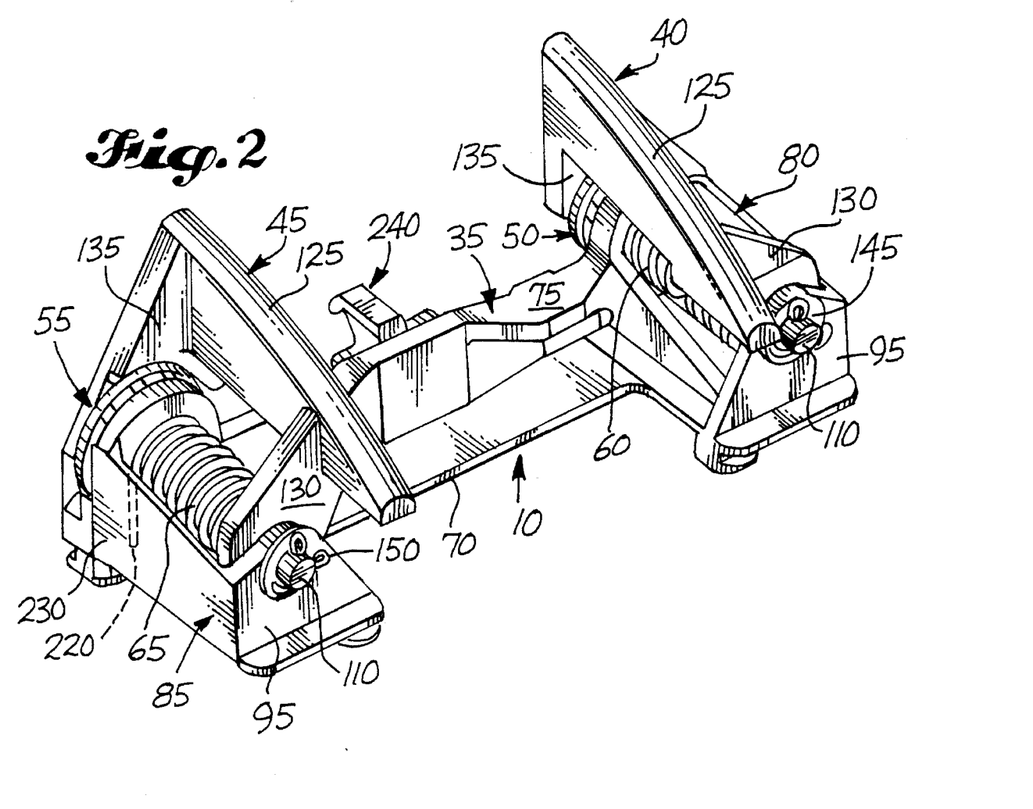
FIG. 2 is a perspective view of the instant assembly in its normal upright position, viewed from its outboard side.
Figure 3:
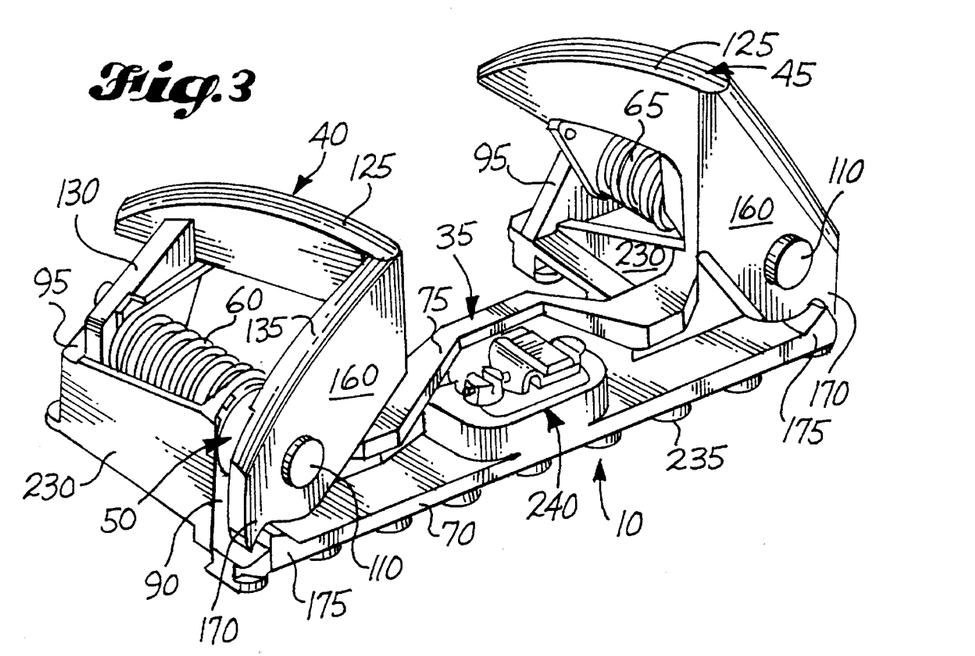
FIG. 3 is a perspective view of the assembly of FIG. 2 in its normal upright position, viewed from its inboard side.

As illustrated in FIG. 1, a series of all metal cargo system rollout stop assemblies 10 (only generally shown), formed in accordance with the present invention, may be fixedly positioned on the main cargo deck 15 proximate or just inboard of the side Cargo door 20 of a cargo airplane 25 (only part of which is shown). The function of the assemblies 10 is to allow a cargo body 30, normally a loaded cargo container or cargo pallet, to pass over the rollout stop assemblies 10 in a first or inboard direction during the loading operation. For safety reasons, the assemblies 10 obstruct passage of the body 30 in the opposite or outboard direction and prevent it from rolling back out through the side cargo door 20.

FIGS. 2–6 depict an embodiment of the rollout stop assembly 10 as generally comprising a frame 35, a first arm assembly 40 and a second arm assembly 45 rotatably mounted in the frame 35, a first dog clutch assembly 50 for releasably coupling the first arm assembly 40 to the frame 35, a second dog clutch assembly 55 for releasably coupling the second arm assembly 45 to the frame 35, a first torsional compression spring 60 for biasing the first arm assembly 40 in an upright position and a second torsional compression spring 65 for biasing the second arm assembly 45 in an upright position. Each arm assembly normally extends upwardly into the path of movement of the cargo body 30 until engagement with the cargo body 30 simultaneously causes the first and the second arm assembly 40, 45, respectively, to translate in the direction of the cargo body 30 and rotate downwardly thereby allowing the cargo body 30 to pass to an inboard position within the airplane 25. Once the cargo body passes over the stop assembly 10, the first and the second torsional compression springs 60, 65, respectively, force the first and the second arm assembly back into a normal upright position.

Figure 4:
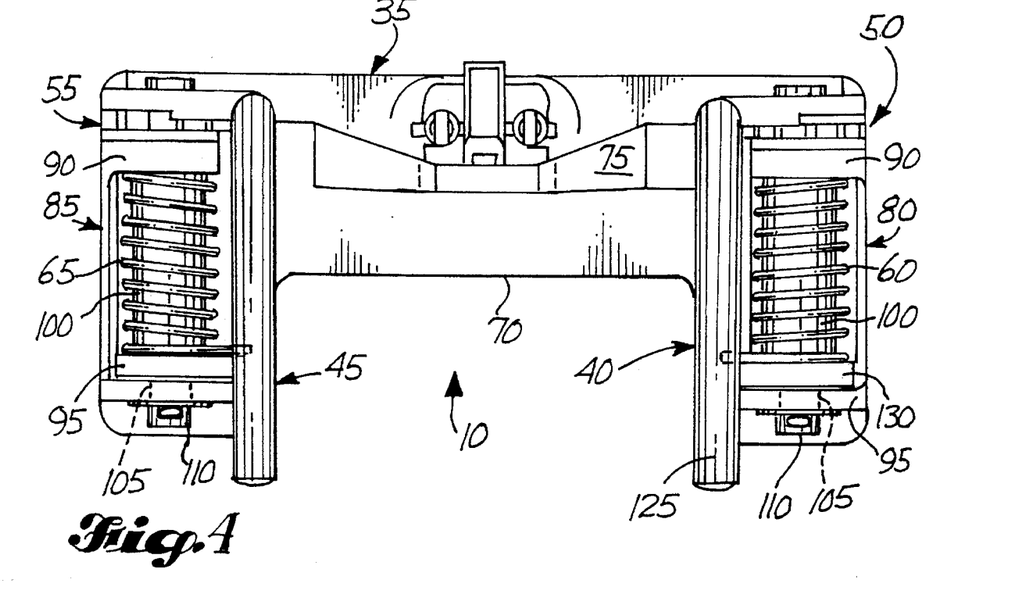
FIG. 4 is a plan view of the instant invention in its normal upright position, viewed from above from its outboard side.
Figure 6:
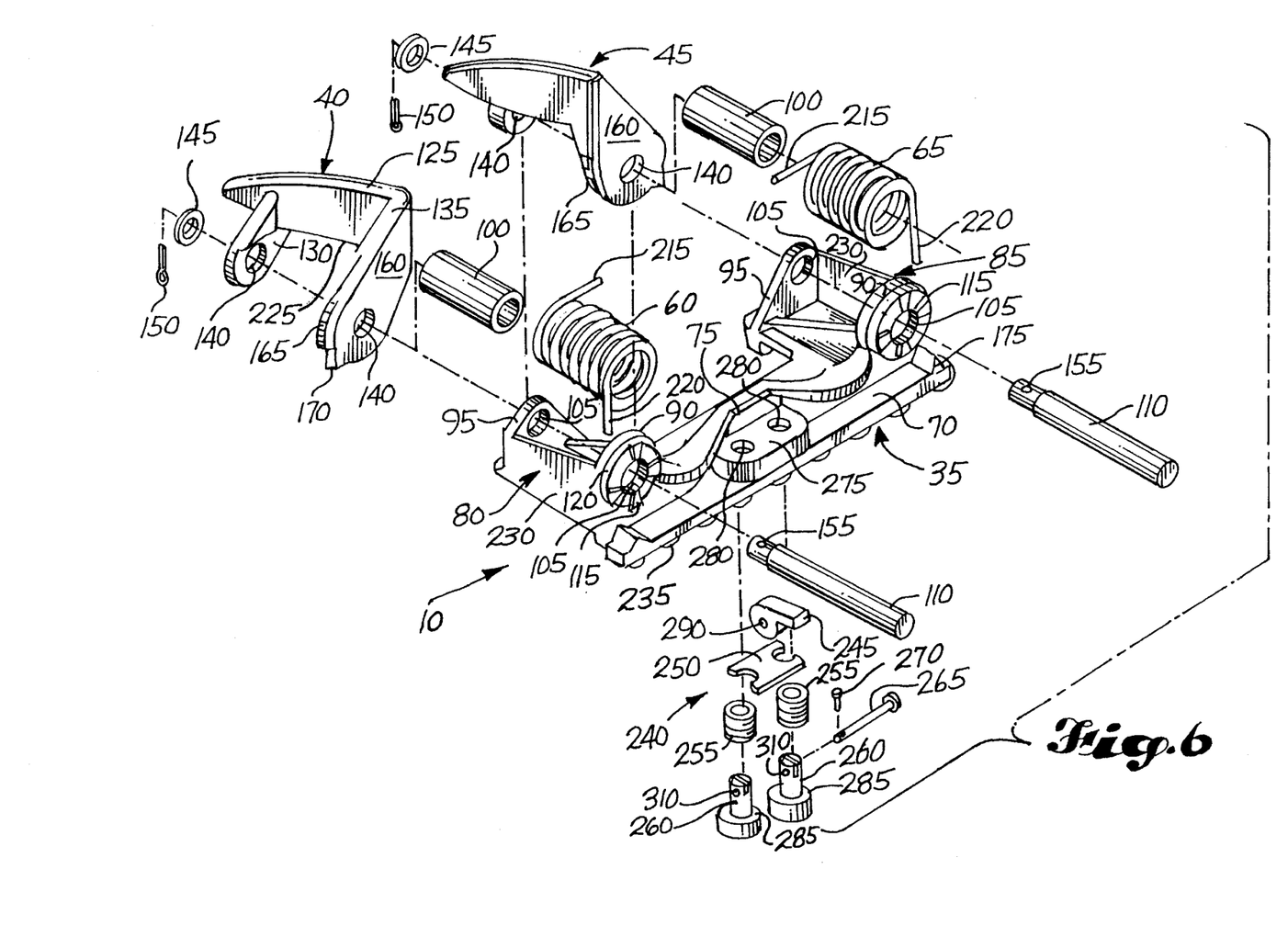
FIG. 6 is an exploded view of the cargo system rollout stop assembly of the present invention viewed from its inboard side.
Figure 7:
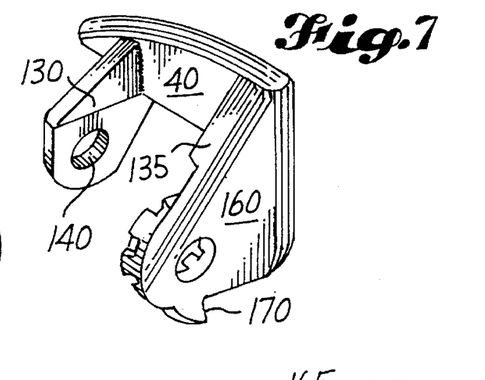
FIG. 7 is a perspective of a rotatable arm assembly viewed from its inboard side.
Figure 8:
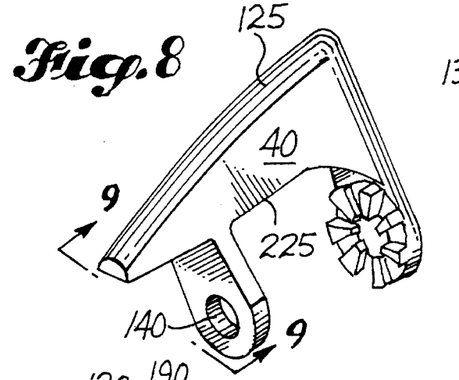
FIG. 8 is another perspective of the arm assembly of FIG. 7 viewed from its outboard side.
Figure 9:
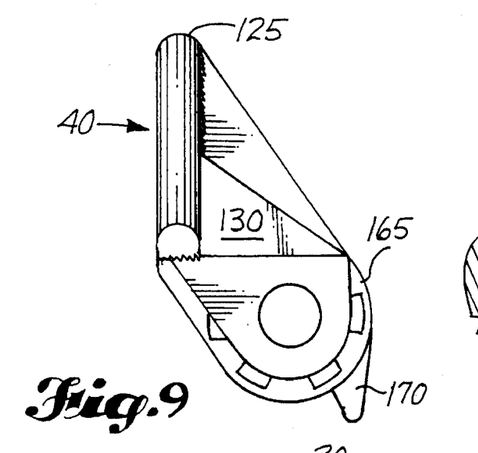
FIG. 9 is an end view of the arm assembly of FIG. 7 taken along lines 9—9 in FIG. 8.
Figures 10, 11:
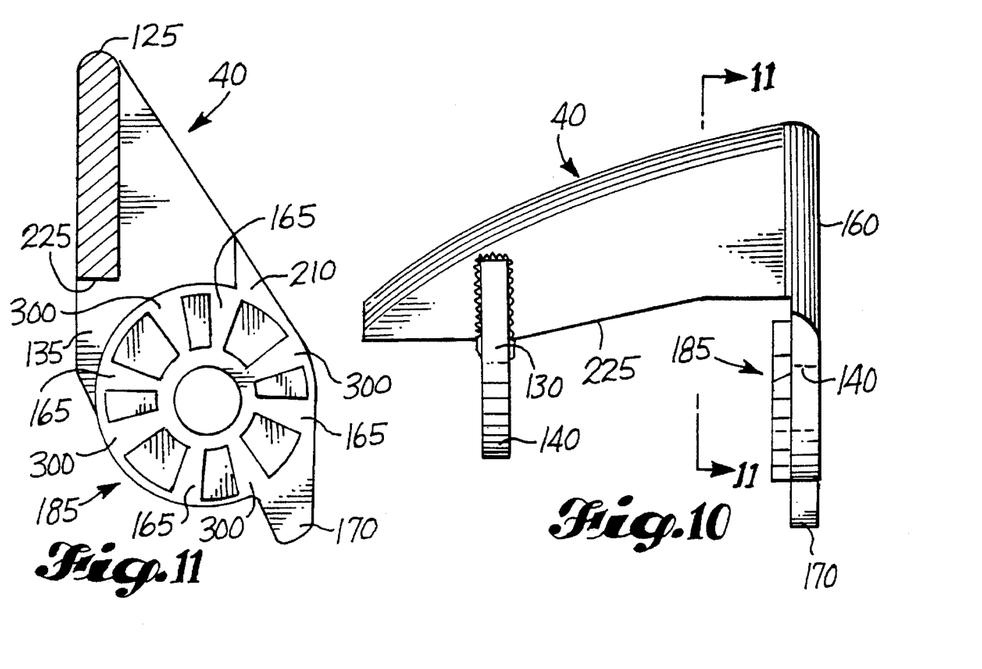
FIG. 10 is a side view of the arm assembly of FIG. 7.
FIG. 11 is a cross-sectional view taken along lines 11—11 in FIG. 10 and illustrating a portion of a dog clutch assembly that is integral with the arm assembly of FIG. 7.

As shown most clearly in FIGS. 4 and 6, the frame 35 is of generally rectangular shape, having a solid base 70 and an open top. Weight is minimized by cutting back on both the inboard and outboard side of the frame and retaining only a structural reinforcement 75 proximate the mid portion of the frame 35. Of course, as will be obvious to one of ordinary skill in the art, these are matters of design choice and detail and are variable depending upon requirements dictated by the environment in which the frame will be used. The frame 35 may be fixedly mounted on the cargo deck 15 near the side cargo door in a manner more fully explained below.

The frame 35 also comprises a first housing 80 and a second housing 85 formed on the outer extremities of the frame for rotatably supporting the first arm assembly 40 and the second arm assembly 45, respectively. Since each housing is constructed similarly except for obvious necessary modifications caused by their location on the frame, only the first housing 80 will be described. The first housing comprises an inboard brace 90 and an outboard brace 95 for receiving a cylindrical sleeve 100 that limits the motion or translation of the first arm assembly 40 and constrains the first torsional compression spring 60, as will be better understood hereinafter. The inboard brace 90 and the outboard brace 95 are each provided with a bore 105 callable of receiving a pin 110 upon which the first arm assembly 40 may be rotatably carried or supported. A series of radial teeth 115, comprising one half of the first dog clutch assembly 50, is machined on the exterior or inboard facing surface 120 of the inboard brace 90. The radial teeth 115 releasably mates with or may be coupled with the other half of the first dog clutch assembly 50, as will be better understood hereinafter.

The first arm assembly 40 is constructed as a mirror image of the second arm assembly 45. They operate in an identical fashion except that the first arm assembly 40 can rotate counterclockwise as viewed in FIG. 2 when contacted or engaged by the cargo body 30 and the second arm assembly 45 can rotate clockwise as viewed in FIG. 2 when engaged by the cargo body. Therefore, for the purposes of simplicity and clarity, only the first arm assembly 40 will be described with particular reference to FIGS. 2 and 6–11.

The first arm assembly 40 comprises a linear camming surface 125 fixed by any appropriate means, such as for example, welding, or casting, to an outboard flange 130 and an inboard flange 135. As will be better understood hereinafter, the purpose of the camming surface 125 is to receive or engage a cargo body 30 when the body 30 is being loaded in a first direction or onboard the airplane 25. As it contacts the camming surface, the body 30 will cause the first arm assembly 40 to translate slightly in the first or inboard direction whereby the first dog clutch assembly 50 may be disengaged and the first arm assembly may be rotated in a counterclockwise direction into the first housing 80.

As best shown in FIG. 6, the outboard flange 130 may be placed within the first housing 80 proximate the outboard brace 95 and the inboard flange 135 extends outside the first housing 80. Both the inboard flange 135 and the outboard flange 130 are provided with a bore 140 which is alignable with the bores 105 formed in the inboard brace 90 and the outboard brace 95 of the first housing 80. The first arm assembly 40 may thus be rotatably mounted on the first housing 80 by means of the pin 110, a washer 145 and a cotter pin 150 which is insertable in a small bore 155 formed in the outboard end of the pin 110. On the interior or inboard facing portion of the inboard flange 135 is an abutment surface 160 for contacting and restraining a cargo body 30 after the body 30 has translated past the rollout stop assembly 10 as will be more clearly understood hereinafter.

Figure 5:
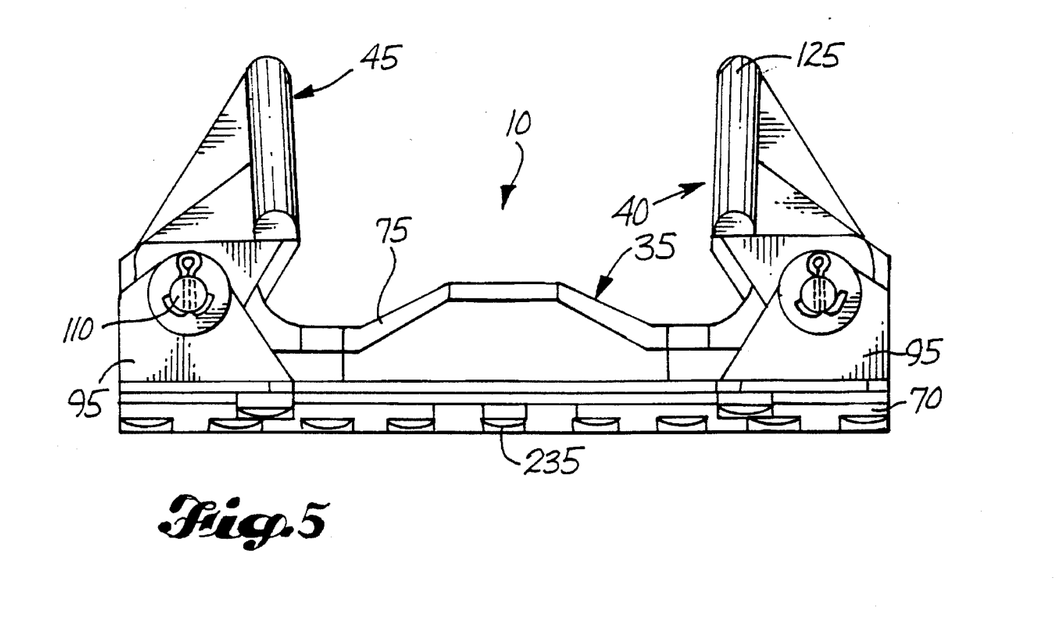
FIG. 5 is a side view of the rollout stop assembly of FIG. 4 in its normal upright position viewed from its inboard side.

An important feature of the present rollout stop assembly 10 is the camming surface 125 of each arm assembly. As best shown in FIGS. 4 and 5, the camming surface 125 is straight or linear, not spiral as in Jensen, et al. (see above). All points along the centerline of the camming surface 125 are equidistant from the centerline of the pin 110 which is the axis of rotation for the first arm assembly 40. The distance between the pin 110 and the centerline of the camming surface 125 is selected so as to ensure that an appropriate moment may be generated whenever or wherever the cargo body 30 engages the camming surface 125. As a consequence, even if the cargo container or pallet of a cargo body 30 has an upwardly warped leading edge, it can contact any point along the camming surface 125 and generate sufficient torsion or moment to cause the first arm assembly 40 to rotate downwardly into the first housing 80. It is thus less likely that the first arm assembly 40 will remain in an upright position and thus not allow a cargo body 30 to be loaded onto the airplane 25. If desired, a plate (not shown) may bridge the outboard flange 130 and the inboard flange 135 to increase the surface that may be engaged by a cargo body 30. Such plate may be useful in protecting the rollout stop assembly 10 from damage due to ingestion of debris or other extraneous matter.

As shown in FIGS. 7–11, a series of eight (8) radial grooves 165 comprising the other half of the first dog clutch assembly 50 is machined on the interior surface of the inboard flange 135. The radial grooves 165 can be detachably coupled to or mated with the radial teeth 115. The first dog clutch assembly 50 normally locks the first arm assembly 40 in its upright position in anticipation of the possible engagement with the cargo body 30. A small extension 170 on the inboard flange 135 of the assembly 40 cooperates with a stop 175 formed on the base 70 of the frame 35 to ensure that the first arm assembly 40 does not rotate in an undesirable direction, i.e., in a clockwise direction (see FIG. 3). The first dog clutch assembly 50 also provides a means for locking the first arm assembly 40 in a down position, as will be better described below in reference to FIGS. 19 and 20.

Figure 12:
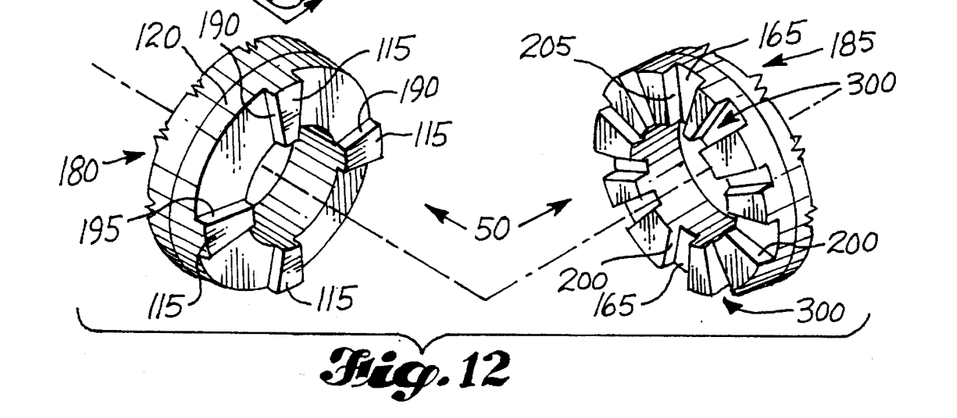
FIG. 12 is a partial isometric view of the dog clutch assembly.
Figure 13:
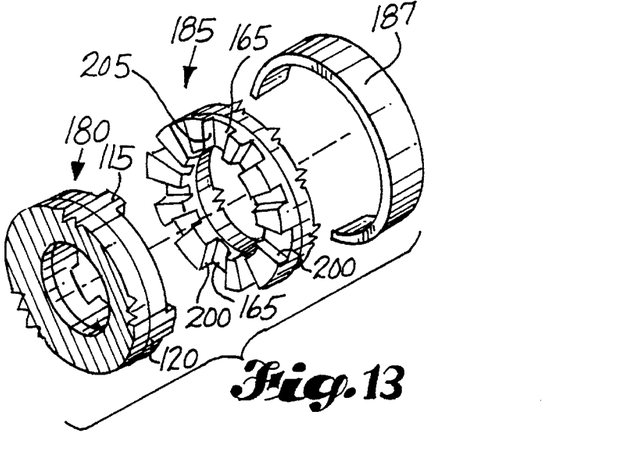
FIG. 13 is another partial isometric view of the dog clutch assembly of FIG. 12 and illustrating a dust shield that may be used in connection with the dog clutch assembly.
Figures 14, 15:
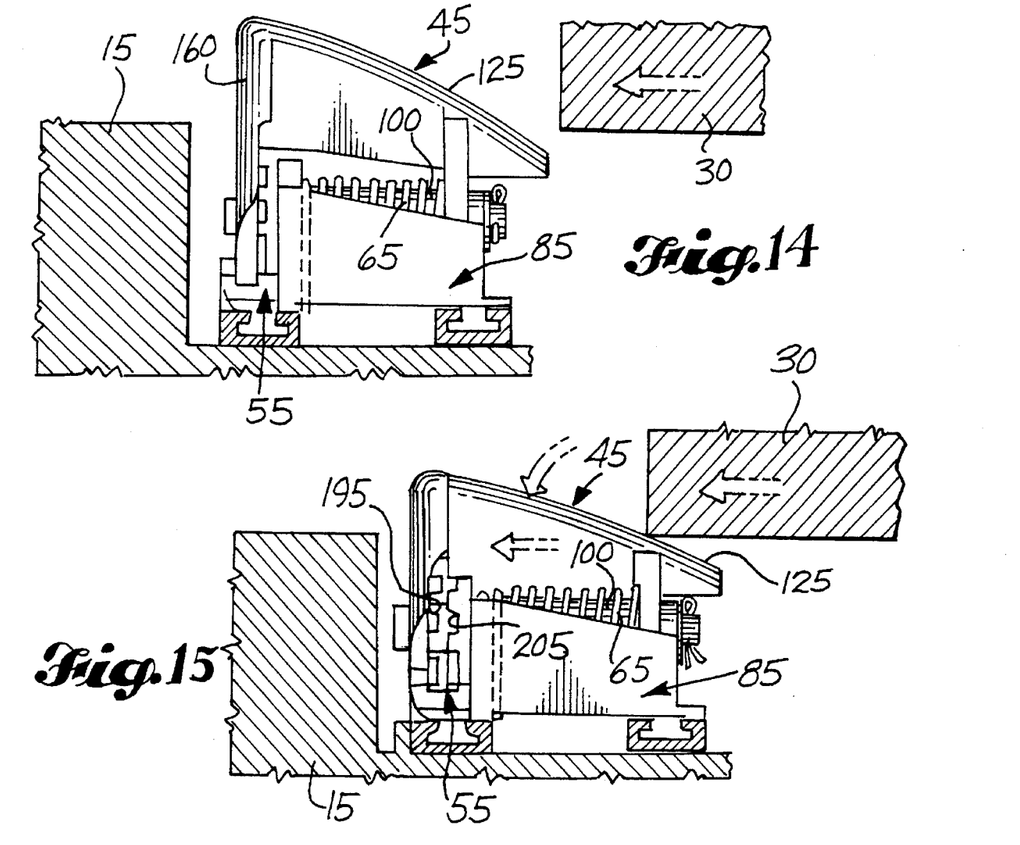
FIG. 14 is a schematic side view showing the orientation of the present rollout stop assembly just prior to engagement by the leading edge of a cargo container or pallet moving in a first or inboard direction onto the airplane.
FIG. 15 is a schematic side view showing the orientation of the stop assembly after the leading edge of the moving cargo container or pallet has engaged the arm assembly of the present invention and the dog clutch assembly has disengaged.

The first dog clutch assembly 50 is substantially the same as the second dog clutch assembly 55 and is best shown in FIGS. 12 and 13. As shown therein, the first dog clutch assembly comprises a stationary clutch subassembly 180 and a rotatable clutch subassembly 185. FIG. 13 also shows a shield 187 for protecting the first dog clutch assembly from dust, dirt, and other contaminants. The shield may be removably attached to the inboard flange 135 of the first arm assembly 40 by any conventional means (not shown).

The stationary clutch subassembly 180 comprises the radial teeth 115. In the case of the first dog clutch assembly 50, the faces of the edges 190 of the teeth 115 opposing the rotation of the first arm assembly 40, are slightly inclined (not well illustrated for the proposes of simplicity). The other face of the edges 195 of the teeth 115 are machined to be perpendicular to the surface 120 of the inboard brace 90.

The rotatable clutch subassembly 185 comprises the series of radial grooves 165 which are capable of releasably mating or coupling with the radial teeth 115 of the stationary clutch subassembly 180. The sides 200 of the grooves 165 facing the inclined edges 190 of the teeth 115 are also inclined and mate with the inclined edges 190 when the first dog clutch assembly 50 is engaged. The inclined edges and sides of the mated teeth 115 and grooves 165 facilitate disengagement of the first dog clutch assembly 50 when the cargo body 30 contacts the camming surface 125 permitting counter rotation of the first arm assembly 40 into a down position, as will be better understood hereinafter. The other sides 205 of the grooves 165 are machined to be perpendicular to the interior surface 210 of the inboard flange 135 and mate with the perpendicular teeth edges 195 when the first arm assembly 40 is locked in a down position as will be discussed below. The radial teeth 115 on the stationary clutch subassembly 180 and the grooves 165 for the rotatable clutch subassembly 185 for the second arm assembly 45 are configured in an obvious manner to achieve the same function taking into account the clockwise direction of rotation of the assembly 45.

As perhaps best shown in FIG. 4, the radial teeth 115 of the stationary clutch subassembly 180 are biased into engagement with the radial grooves 165 of the rotatable clutch subassembly 185 by means of the first torsional compression spring 60. The spring 60 may be compressed within the first housing 80 and fits about and is supported upon the cylindrical sleeve 100 that may be nestled within the first housing 80. As shown in FIG. 4, the pin 110 may be inserted through the sleeve 100. The length of the sleeve 100 plus the thickness of the outboard flange 130 is sized to be slightly smaller than the distance between the inboard brace 90 and the outboard brace 95 of the first housing 80. The spring 60 and the cylindrical sleeve 100 thus allows the first arm assembly 40 to slightly translate in the direction of the cargo body 30 when it is moving onboard the airplane 25 and it contacts the camming surface 125. In allowing this movement of the first arm assembly, the first dog clutch assembly 50 disengaged allowing the first arm assembly to rotate counterclockwise out of the way of the cargo body 30 when it is moving onboard the airplane. The sleeve 100 also prevents undue or uncontrolled translation of the assembly 40 that would cause disassembly of the rollout assembly 10.

As shown in FIGS. 2, 4, 6, and 11 the first torsional compression spring 60 has a first end 215 and a second end 220. The first end 215 engages the underside section 225 of the camming surface 125 and the second end 220 contacts a fixed plate 230 extending within the first housing 80 between the inboard brace 90 and the outboard brace 95. Constrained by the underside section 225 and the fixed plate 230, the spring 60 is capable of resisting the rotation of the first arm assembly 40 in a counterclockwise direction, biasing the assembly towards its upright position and returning the first arm assembly 40 back into its upright position after the cargo body 30 passes over the rollout stop assembly 10. The spring 60 also reengages the first dog clutch assembly 50 after the cargo body 30 passes over the rollout stop assembly 10.

The operation of the cargo system rollout stop assembly 10 is shown in FIGS. 14–18. As partially seen in FIG. 14, when a cargo body 30 is just moved onto the airplane 25 in a first or inboard direction, the first arm assembly 40 and the second arm assembly 45 are biased into their normal upright position by the first torsional compression sprig 60 and the second torsional compression spring 65, respectively. The spring 60 biases the stationary clutch subassembly 180 of the first dog clutch assembly 50 into close engagement with the rotatable clutch subassembly 185 and the spring 65 achieves the same function for the second dog clutch assembly 55.

When the cargo body 30 contacts the camming surface 125 of the first arm assembly 40 and the second arm assembly 45 (see FIG. 15), each arm assembly translates slightly in the same direction of movement of the cargo body. This translation, which is aided by the inclined surfaces of the radial teeth 115 of the stationary clutch subassembly 180 and the grooves 165 of the rotatable clutch subassembly 185, causes the first dog clutch assembly 50 and the second clutch assembly 55 to disengage.

Figure 16:
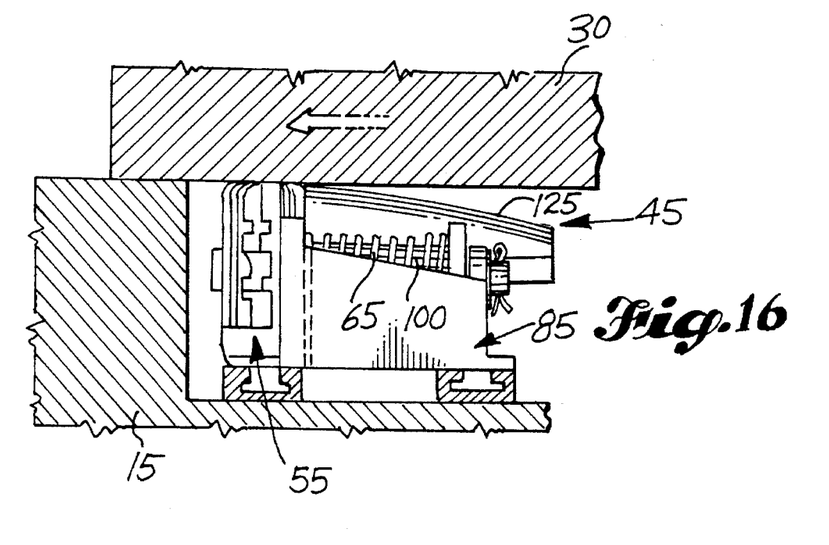
FIG. 16 is a schematic side view showing the orientation of the arm assembly after the cargo container or pallet has caused the arm assembly to rotate downwardly into a position allowing the container or pallet to move inboard onto the airplane.
Figure 17:
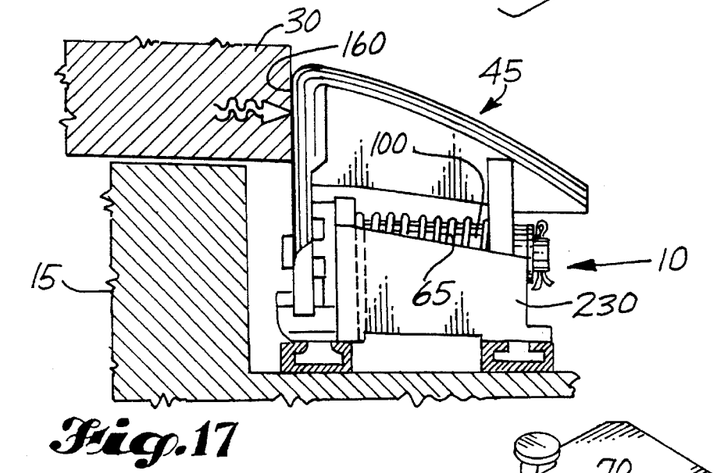
FIG. 17 is a schematic side view showing the orientation of the instant cargo rollout stop assembly after the trailing edge of the cargo container or pallet has passed beyond the inboard boundary of the assembly.
Figure 18:
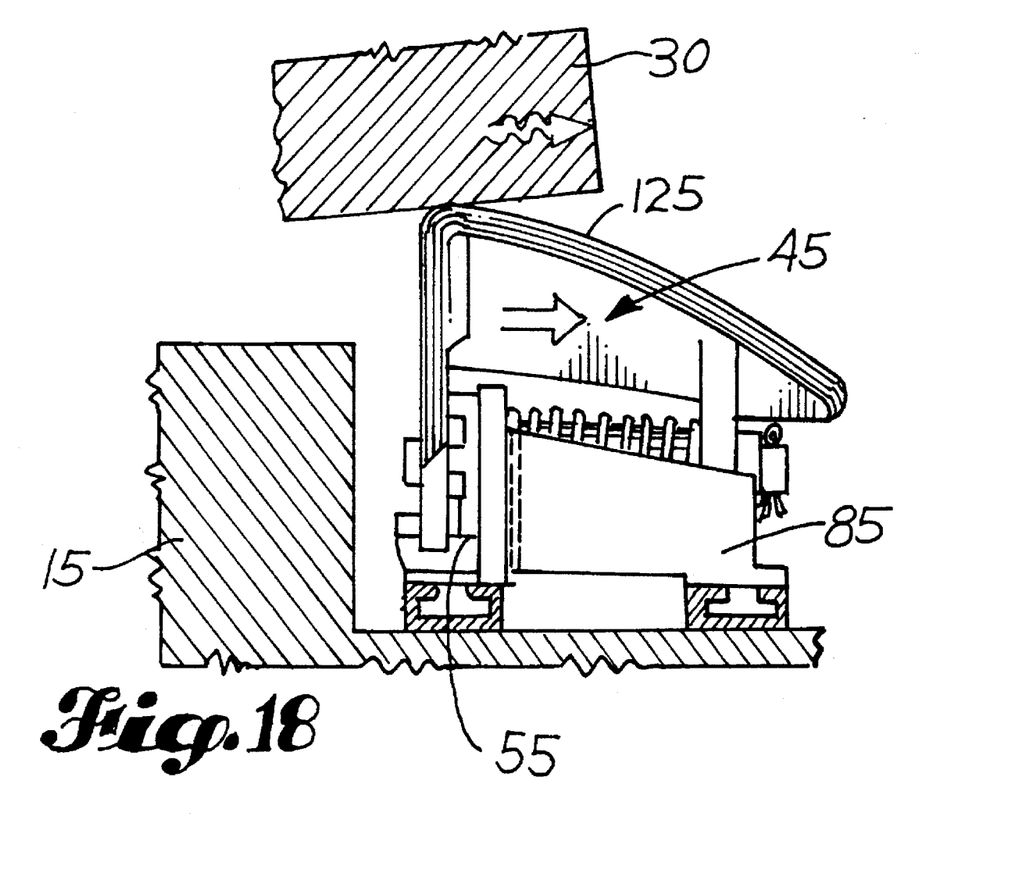
FIG. 18 is a schematic side view showing the orientation of the instant cargo rollout stop assembly in the situation where the curled up trailing edge of the cargo container or pallet has inadvertently passed beyond the boundary of the assembly.

The disengagement of the clutch assemblies 50,55 plus the torsional moment created by the body 30 contacting the careening surfaces 125 permits the arm assemblies 40, 45 to rotate in a downwardly direction into the first housing 80 and the second housing 85, respectively, as shown in FIG. 16. Once the cargo body 30 passes over the stop assembly 10, the springs 60, 65 force the arm assemblies 40, 45 back into their normal upright position. In that position, the abutment surface 160 on each arm assembly 40, 45 can obstruct the translation of the cargo body 30 in an outboard direction (see FIG. 17).

As noted above, the cargo containers or pallets comprising the cargo body may have warped outer edges. If that is the case, the body 30 could translate in an uncontrolled condition in an outboard direction and move over, e.g., the second arm assembly 45 (see FIG. 18). In doing so, the cargo body 30 applies an outboard force to the assembly 45 which holds the dog clutch assembly 55 engaged. With the dog clutch assembly 55 engaged the second arm assembly 45 will not rotate downwardly out of the way of the body 30 and will thus stop the outward motion of the body. This is yet another distinguishing feature of the present invention and is a primary reason for using a dog clutch assembly as described herein.

Figure 19:
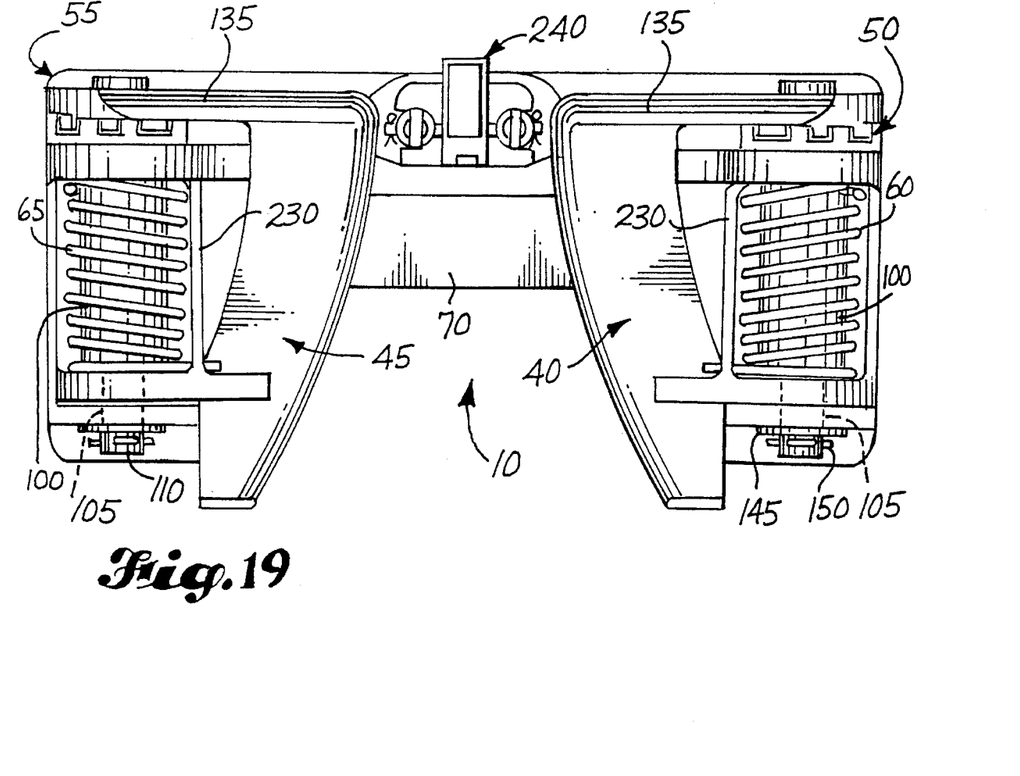
FIG. 19 is a plan view of the instant invention in a locked down position, viewed from above from its outboard side.
Figure 20:
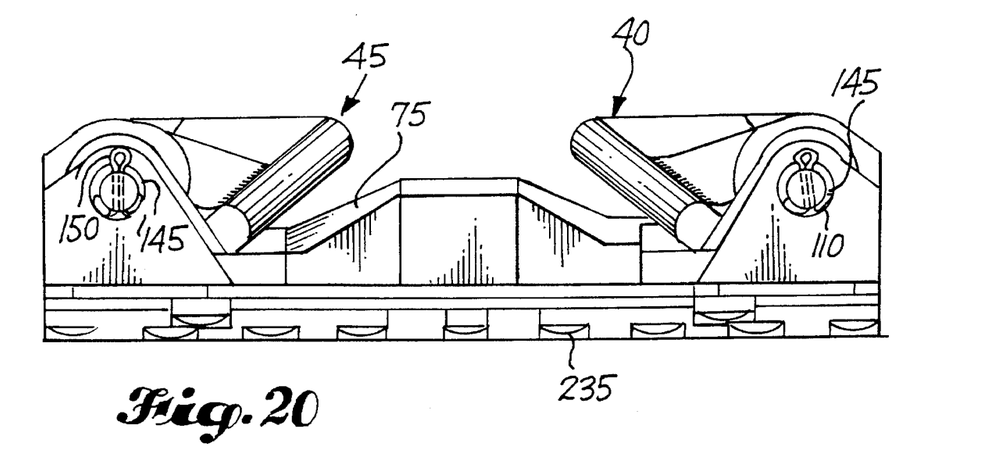
FIG. 20 is a side view of the rollout stop assembly of the present invention in a locked down position viewed from its inboard side.

As shown in FIGS. 19 and 20, the arm assemblies 40, 45 can be locked in a down position so that the cargo body 30 may be moved off the airplane 25 in an outboard direction. The assemblies 40, 45 may be locked down by manually rotating the first arm assembly 40 in a counterclockwise direction (as viewed in FIG. 19) and rotating the second arm assembly 45 in a clockwise direction. When the angle of rotation of each arm assembly exceeds the angle of rotation caused by the motion of the cargo body 30 the radial teeth 115 will lock with additional grooves 300; see FIG. 11. To place the assemblies 40, 45 in their normal upright position, the assemblies are manually translated in an inboard direction to disengage the teeth 115 from the additional grooves 300 thereby allowing the springs 60, 65 to rotate the first arm assembly 40 and the second arm assembly 45 clockwise and counterclockwise, respectively to the upright position.

Figure 21:
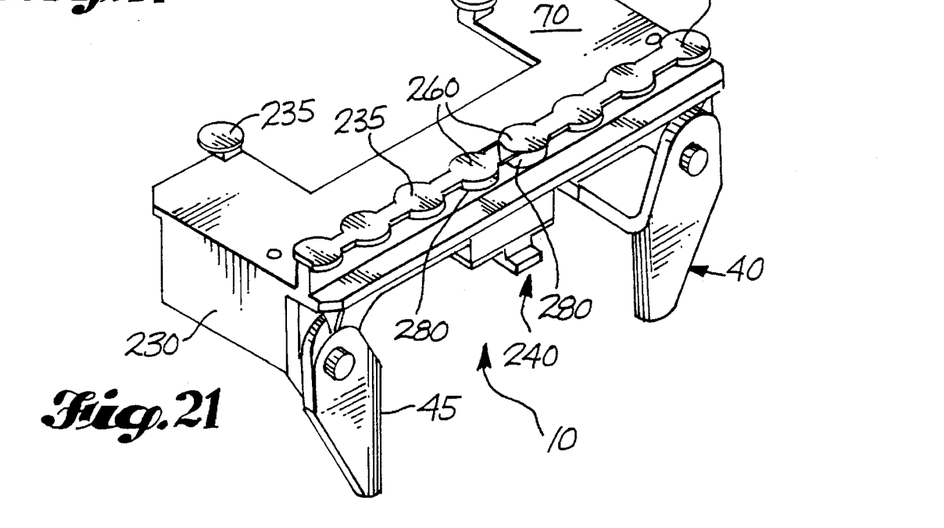
FIG. 21 is an inverted perspective view of the cargo system rollout stop assembly of the present invention shown in FIG. 2, illustrating one means of attaching the assembly to a cargo deck.

The stop assembly 10 can be mounted to the main cargo deck 15 by means of a plurality of track pins 235 and a conventional locking assembly 240. As shown in FIG. 21, the track pins 235 are formed on the under surface of the base 70 of the frame 35 and are configured to fit within conventional tracks (not shown) established on the cargo deck 15. As best seen in FIG. 6, the clamping assembly 240 comprises a lever 245 having a bore, a shim 250 provided with opposing cutouts, a pair of compression springs 255, a pair of stud shear pins 260, a pin 265 and a cotter pin 270.

The locking assembly 240 is supported on a mount that is machined on the top side of the base 70 of the frame 35. The mount 275 is provided with a pair of bores 280 through which the stud shear pins 260 may freely pass. The lever 245 is placed upon the shim 250 and the shim 250 rests directly on the upper surface of the mount 275. The lever 245 is shaped to create a downward force when pivoted upwardly. The springs 255 may be compressed between the underside of the mount 275 and lips 285 formed on the stud pins. A hole 310 in the upper end of the shear pins 260 receive the pin 265. The shear pins 260 pass through the bores 280 and the cutouts formed in the shim 250 and are disposed on both sides of the lever 245. The pin 265 passes through the hole 310 of the first one of the shear pins 260, through a bore 290 formed in the lever 245 and then through the hole 310 of the second of the pair of shear pins 260. The cotter pin 270 is inserted in a small bore formed in the end of the pin 265.

In use, track pins 235 of the stop assembly 10 are positioned in a desired position in the tracks formed in the main cargo deck 15 near the side cargo door 20. The lever 245 is shaped so that when it is pivoted downwardly, the shear pins 285 are forced downwardly by the springs 255 and engage bores, not shown, in the cargo deck 15 and lock the stop assembly 10 in place. The assembly 10 is easily removed by pivoting the lever upwardly causing the shear pins 260 to move upwardly thereby releasing the assembly 10 from the cargo deck 15.

While a preferred embodiment of the present invention has been illustrated and described, it should be understood that variations could be made therein without departing from the spirit and scope of the invention. Accordingly, it is to be understood that the invention is not to be limited to the specific embodiment illustrated and described. Rather the true scope and spirit of the invention is to be determined by reference to the following claims.

The embodiments of the invention in which an exclusive property or privilege is claimed are defined as follows:

1. A rollout stop assembly allowing a movable object to pass over it in one direction but obstructing passage in the opposite direction, said assembly comprising:

(a) a frame;

(b) an arm assembly rotatably mounted in said frame, said arm assembly normally extending in an upright position into the path of the movement of said object and capable of slight movement in said one direction;

(c) said arm assembly having a camming surface engagable with said object when it is moving in said one direction, said camming surface being configured to cause said arm assembly to translate in said one direction and to rotate in a downward direction and out of the path of said object upon engagement therewith, said arm assembly rotating about an axis lying substantially parallel to the direction of movement of said object;

(d) a dog clutch assembly releasably connecting said arm assembly to said frame and normally preventing said arm assembly from rotating, said dog clutch assembly disengaging said arm; assembly from said frame when said object engages said arm assembly camming surface whereby when said object engages said camming surface, said arm assembly translates in said one direction and rotates in said downward direction;

(e) means for rotating said arm assembly back into the path of the object after the object has passed beyond said arm assembly, and (f) said arm assembly having an abutment surface for engaging said object after said arm assembly has been rotated back to its normal upright position to prevent movement of said object in said opposite direction.

2. The assembly of claim 1, wherein said dog clutch assembly comprises a rotatable clutch subassembly integral with said arm assembly and a stationary clutch subassembly integral with said frame, said stationary clutch subassembly mating with said rotatable clutch subassembly when said arm assembly is in said upright position.

3. The assembly of claim 2, wherein said stationary clutch subassembly comprises a plurality of radial teeth, said rotatable clutch subassembly comprises a plurality of radial grooves capable of mating with said radial teeth.

4. The assembly of claim 3, wherein at least one of said radial teeth has an inclined surface for opposing rotation of said arm assembly and at least one of said radial grooves has an inclined surface capable of abutting said inclined surface of said at least one of said radial teeth, whereby when said object engages the camming surface of said arm assembly, said arm assembly moves in said one direction and each inclined surface of said teeth and each inclined surface of said grooves facilitates the disengagement of said dog clutch assembly whereby said arm assembly may rotate in said downward direction.

5. The assembly of claim 4, wherein when said arm assembly is rotated in said downward direction, allowing said object to pass over it in said one direction, said teeth and said grooves are not engaged and said rotatable clutch subassembly and said stationary clutch subassembly are in abutting contact only.

6. The assembly of claim 5, further comprising locking means for locking said arm assembly in a downward position out of the path of said object.

7. The assembly of claim 6, wherein said rotatable clutch subassembly comprises an additional set of radial grooves, said locking mess comprises said radial teeth on said frame and said additional set of radial grooves.

8. The assembly of claim 3, further comprising a stop means for preventing said arm assembly from rotating in a direction other than said downward direction.

9. The assembly of claim 8, wherein said stop means comprises an extension on said arm assembly and a stop surface on said frame.

10. The assembly of claim 2, wherein, a centerline of said camming surface is parallel to the axis of rotation of said arm assembly.

11. The assembly of claim 1, wherein said arm assembly rotating means comprises a torsional compression spring.

12. The assembly of claim 2, wherein said arm assembly rotating means comprises a torsional compression spring, said spring biases said stationary clutch subassembly into engagement with said rotatable clutch subassembly, whereby when said arm assembly is in said upright position and said dog clutch assembly is engaged, if said object rides over said arm assembly, said object will also induce forces to maintain engagement of said dog clutch assembly.

* * * * *